Patented May 23, 1950

2,508,916

UNITED STATES PATENT OFFICE 2,508,916

FUNCTIONALLY ALIPHATIC 1,2,2,3-TETRA-CHLORO-N-BUTYL ETHER

Walter D. Harris, Naugatuck, Conn., and Theodore W. Kerr, Kingston, R. I., assignors to United States Rubber Company, New York, N. Y., a corporation of New Jersey No Drawing. Application January 29, 1947, Serial No. 725,162

11 Claims. (Cl. 167—22)

This invention relates to improvements in insecticides. The term "insecticide" is considered to include larvaecides, arachnicides, and insect repellents or insectifuges, and is to be construed in accordance with the Insecticide Act of 1910, section 6.

We have found that functionally aliphatic 1,2,2,3-tetrachloro-n-butyl ethers are effective insecticides. Such functionally aliphatic 1,2,2,3-tetrachloro-n-butyl ethers are the alkyl, cycloalkyl, aralkyl and alkenyl 1,2,2,3-tetrachloro-n-butyl ethers, the preparation of illustrative examples of which are shown in Examples I to VI below. These are new chemicals which we have found to be toxic to a wide variety of insects, including the greenhouse red spider mite and the Mexican bean beetle, which insects are not effectively controlled by the known insecticide 2,2-bis-(p-chlorophenyl)-1,1,1-trichloroethane (DDT). The aliphatic 1,2,2,3-tetrachloro-n-butyl ethers may be represented by the general formula

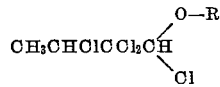

in which R is a functionally aliphatic, i. e. an alkyl, cycloalkyl, aralkyl or alkenyl radical. These compounds are readily prepared by adding the selected alcohol to butyl chloral to form, quantitatively, the butyl chloral alcoholate. The butyl chloral alcoholate is then converted by phosphorus pentachloride or other halogenating agent to the 1,2,2,3-tetrachloro-n-butyl ether and hydrogen chloride. The conversion of the alcoholate to the 1,2,2,3-tetrachloro-n-butyl ether is conveniently carried out in an inert solvent such as ethyl ether at room temperature or lower. Other conventional halogenating agents than phosphorus pentachloride, e. g. thionyl chloride, dry hydrogen chloride, phosphorus trichloride, etc., could also be used.

The reactions involved are as follows:

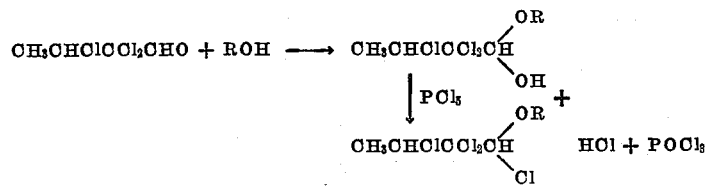

The 1,2,2,3-tretrachloro-n-butyl ethers of the present invention may be applied to loci to be protected against insects in undiluted form, or as dusts when admixed with or adsorbed on powdered solid carriers, such as clay or talc, or as liquids or sprays when in a liquid carrier, as in solution in a suitable solvent, or dispersed in a suitable non-solvent medium, for example, water. In protecting plants (the term including plant parts) which are subject to attack by insects, the 1,2,2,3-tetrachloro-n-butyl ethers of the present invention are preferably applied as aqueous emulsions containing a dispersing agent. The chemicals may be used admixed with carriers that are active of themselves, for example, other insecticides, fungicides or bactericides. The functionally aliphatic 1,2,2,3-tetrachloro-n-butyl ethers may also be used as intermediates in organic synthesis, as disclosed in applicants' copending application, Serial No. 725,163, filed January 29, 1947. The compounds will undergo many reactions, such as dehydrohalogenation, halogenation, Friedel-Crafts reactions, and others.

Detailed procedures for the preparation of the various compounds of the present invention are described in Examples I to VI given below.

EXAMPLE I

*Ethyl 1,2,2,3-tetrachloro-n-butyl ether*

One gram mole (46 g.) of anhydrous ethyl alcohol was added slowly with thorough agitation to 1 mole (175.5 g.) of butyl chloral. The solutions warmed rapidly as the alcohol was added. The clear colorless alcoholate was allowed to cool, then dissolved in 100 cc. of dry ethyl ether. This solution was added slowly, with stirring and cooling in an ice water bath, to 210 g. of phosphorus pentachloride in 100 cc. of dry ethyl ether. The solution was added at such a rate that the temperature of the reaction mixture did not climb much above 20° C. As soon as addition was complete, the cooling bath was removed and stirring was continued for another hour. The ether solution was poured into two or three volumes of ice water and was stirred vigorously for one hour. The oil layer was separated and washed with dilute aqueous alkali until the wash water gave a slightly basic reaction and finally with water. The ether we removed on the steam bath and the product was distilled rapidly under reduced pressure. A yield of 180 g. of water white liquid boiling at 84-86° C./4 mm. was obtained. Refractive index $n_D^{20}$ 1.4869. Analysis calculated for $C_6H_{10}OCl_4$, 59.12% Cl; found 58.87% Cl.

EXAMPLE II

Isobutyl 1,2,2,3-tetrachloro-n-butyl ether

This compound was prepared from isobutyl alcohol (18.5 g.), butyl chloral (44 g.), phosphorus pentachloride (54 g.) using ether as a solvent, as described in Example 1. A yield of 37 g. of water white liquid boiling at 85-92° C./2.2 mm. was obtained. Refractive index, $n_D^{20}$ 1.4782. Analysis calculated for $C_8H_{14}OCl_4$, 52.92% Cl; found 52.85% Cl.

EXAMPLE III

β-chloroethyl 1,2,2,3-tetrachloro-n-butyl ether

This compound was prepared from anhydrous ethylene chlorohydrin (20 g.), butyl chloral (44 g.) and phosphorus pentachloride (54 g.) using ether as a solvent as in Example I. A yield of 44 g. of almost water white liquid boiling at 80-108° C./2.5 mm. was obtained. Refractive index, $n_D^{20}$ 1.5050. Analysis calculated as $C_6H_9OCl_3$, 64.60% Cl; found 64.69% Cl.

EXAMPLE IV

Benzyl 1,2,2,3-tetrachloro-n-butyl ether

This compound was prepared from butyl chloral (44 g.) using ether as a solvent, as described in Example I. A yield of 43 g. of colorless oil boiling at 145-150° C./3 mm. was obtained. Refractive index, $n_D^{20}$ 1.5426. Analysis calculated as $$C_{11}H_{12}OCl_4$$

46.96% Cl; found 47.23% Cl.

EXAMPLE V

Allyl 1,2,2,3-tetrachloro-n-butyl ether

This compound was prepared from allyl alcohol (14.5 g.), butyl chloral (44 g.) and phosphorus pentachloride (54 g.) using ether as a solvent, as described in Example I. A yield of 33 g. of a water white oil boiling at 78-81° C./2.5 mm. was obtained. Refractive index, $n_D^{20}$ 1.4958. Analysis calculated as $C_7H_{10}OCl_4$, 56.29% Cl; found 56.85% Cl.

EXAMPLE VI

Cyclohexyl 1,2,2,3-tetrachloro-n-butyl ether

This compound was prepared from cyclohexanol (25 g.), butyl chloral (44 g.) and phosphorus pentachloride (55 g.) using ether as a solvent, as described in Example I. A yield of 35 g. of a water white oil boiling at 118-121° C./2.2 mm. was obtained. Refractive index, $n_D^{20}$ 1.5061. Analysis calculated as $C_{10}H_{16}OCl_4$, 48.23% Cl; found 48.37% Cl.

A wide variety of alcohols may be employed to give the desired functionally aliphatic 1,2,2,3-tetrachloro-n-butyl ether. Examples of functionally aliphatic radicals connected to the ether linkage which is also connected to the 1,2,2,3-tetrachloro-n-butyl radical are alkyl (e. g., methyl, ethyl, n-propyl, isopropyl, n-butyl, sec. butyl, n-amyl, isoamyl, heptyl, octyl, dodecyl), cycloalkyl (e. g., cyclohexyl), aralkyl (e. g., benzyl), alkenyl (e. g., allyl, methallyl), and substituted alkyl groups, such as haloalkyl, cyanoalkyl, alkoxyalkyl, hydroxyalkyl and aryloxyalkyl (e. g., β-chloroethyl, β-cyanoethyl, γ-chloropropyl, β-p-chlorophenoxy-ethyl). Thus, further compounds illustrative of the invention are:

β-cyanoethyl 1,2,2,3-tetrachloro-n-butyl ether
β-thiocyanoethyl 1,2,2,3-tetrachloro-n-butyl ether
β-p-chlorophenoxy-ethyl 1,2,2,3-tetrachloro-n-butyl ether.

The following examples illustrate the effectiveness of various functionally aliphatic 1,2,2,3-tetrachloro-n-butyl ethers as insecticides:

EXAMPLE A

Pinto bean leaves were sprayed with 1% aqueous emulsions of various functionally aliphatic 1,2,2,3-tetrachloro-n-butyl ethers, the emulsions containing small amounts of commercial dispersing agents (Emulfor EL which is a reaction product of ethylene oxide and castor oil, and Nacconal NR which is an alkyl aryl sulfonate), which were known to be non-toxic to the organisms under test. The bean leaves were then infested with approximately 40 Mexican bean beetles (Epilachna varivestis) in four replicates of each treatment. The bean leaves were placed in separate covered petri dishes. After 48 hours observations disclosed mortalities of the beetles on the leaves treated with the various 1,2,2,3-tetrachloro-n-butyl ethers, as shown in the following table. In untreated leaves there was no mortality of the beetles.

| Chemical | Percent Mortality |
|---|---|
| Ethyl 1, 2, 2, 3-tetrachloro-n-butyl ether | 68.4 |
| β-chloroethyl-1, 2, 2, 3-tetrachloro-n-butyl ether | 100 |
| Benzyl 1, 2, 2, 3-tetrachloro-n-butyl ether | 77.5 |

EXAMPLE B

Leaves of the broad bean (Vicia faba) infested with pea aphids (Machrosiphum pisi) were sprayed with 1% aqueous emulsions of various functionally aliphatic 1,2,2,3-tetrachloro-n-butyl ethers, the emulsions containing small amounts of Emulfor EL and Nacconal NR which were known to be non-toxic to the organisms under test. There were a variable number of insects in four replicates of each treatment. Observations were made after 24 hours to disclose the kill of aphids. The percent mortality and the number of pea aphids on the leaves treated with the various 1,2,2,3-tetrachloro-n-butyl ethers are shown in the following table. In the untreated (check) leaves infested with 309 and with 333 aphids, the mortality was 1.6% and 1.8%, respectively.

| Chemical | No. of Aphids | Per cent Mortality |
|---|---|---|
| Ethyl 1,2,2,3-tetrachloro-n-butyl ether | 184 | 95.1 |
| Isobutyl 1,2,2,3-tetrachloro-n-butyl ether | 223 | 75.3 |
| Allyl 1,2,2,3-tetrachloro-n-butyl ether | 291 | 71.8 |
| β-Chloroethyl 1,2,2,3-tetrachloro-n-butyl ether | 218 | 72.0 |
| Cyclohexyl 1,2,2,3-tetrachloro-n-butyl ether | 195 | 59.5 |
| Benzyl 1,2,2,3-tetrachloro-n-butyl ether | 206 | 73.8 |

EXAMPLE C

Pinto bean leaves infested with red spider mites (Tetranychus telarius) were sprayed with 1% aqueous emulsions of various functionally aliphatic 1,2,2,3-tetrachloro-n-butyl ethers, the emulsions containing small amounts of Emulfor EL and Nacconal NR which were known to be non-toxic to the organisms under test. There were variable numbers of mites in four replicates of each treatment. Observations were made after 24 hours to disclose the kill of mites. The percent mortality and number of mites on the leaves treated with the various 1,2,2,3-tetrachloro-n-butyl ethers are shown in the table below. In untreated (check) leaves infested with 275 and with 291 red spider mites, the mortality was 8.7% and 3.4% respectively after 24 hours.

| Chemical | No. of Mites | Percent Mortality |
| --- | --- | --- |
| Ethyl 1,2,2,3-tetrachloro-n-butyl ether | 137 | 87.6 |
| Isobutyl 1,2,2,3-tetrachloro-n-butyl ether | 150 | 56.7 |
| Allyl 1,2,2,3-tetrachloro-n-butyl ether | 198 | 78.3 |
| $\beta$-Chloroethyl 1,2,2,3-tetrachloro-n-butyl ether | 162 | 96.9 |
| Cyclohexyl 1,2,2,3-tetrachloro-n-butyl ether | 182 | 99.5 |
| Benzyl 1,2,2,3-tetrachloro-n-butyl ether | 148 | 99.3 |

Having thus described our invention, what we claim and desire to protect by Letters Patent is:

1. A functionally aliphatic 1,2,2,3-tetrachloro-n-butyl ether.
2. An alkyl 1,2,2,3-tetrachloro-n-butyl ether.
3. A haloakyl 1,2,2,3-tetrachloro-n-butyl ether.
4. An aralkyl 1,2,2,3-tetrachloro-n-butyl ether.
5. Ethyl 1,2,2,3-tetrachloro-n-butyl ether.
6. An insecticidal composition comprising $\beta$-chloroethyl 1,2,2,3-tetrachloro-n-butyl ether.
7. Benzyl 1,2,2,3-tetrachloro-n-butyl ether.
8. An insecticidal composition comprising a functionally aliphatic 1,2,2,3-tetrachloro-n-butyl ether and a powdered solid carrier therefor.
9. An insecticidal composition comprising an alkyl 1,2,2,3-tetrachloro-n-butyl ether and a powdered solid carrier therefore.
10. An insecticidal composition comprising an aqueous emulsion of a functionally aliphatic 1,2,2,3-tetrachloro-n-butyl ether, said aqueous emulsion containing a dispersing agent.
11. An insecticidal composition comprising an aqueous emulsion of an alkyl 1,2,2,3-tetrachloro-n-butyl ether, said aqueous emulsion containing a dispersing agent.

WALTER D. HARRIS.
THEODORE W. KERR.

REFERENCES CITED

The following references are of record in the file of this patent:

UNITED STATES PATENTS

| Number | Name | Date |
| --- | --- | --- |
| 2,129,025 | Rieche et al. | Sept. 6, 1938 |
| 2,209,911 | Bruson et al. | July 30 1940 |
| 2,314,304 | Britton et al. | Mar. 16, 1943 |
| 2,327,338 | Carswell | Aug. 24, 1943 |
| 2,425,534 | Hester et al. | Aug. 12, 1947 |

OTHER REFERENCES

Beilstein vol 1, page 665.